US008718645B2

(12) United States Patent
Anderton et al.

(10) Patent No.: US 8,718,645 B2
(45) Date of Patent: May 6, 2014

(54) MANAGING AUDIO DURING A HANDOVER IN A WIRELESS SYSTEM

(75) Inventors: David O. Anderton, Austin, TX (US); Shaojie Chen, Austin, TX (US)

(73) Assignee: ST Ericsson SA, Plan-les-Ouates (CH)

( * ) Notice: Subject to any disclaimer, the term of this patent is extended or adjusted under 35 U.S.C. 154(b) by 1932 days.

(21) Appl. No.: 11/476,485

(22) Filed: Jun. 28, 2006

(65) Prior Publication Data

US 2008/0002620 A1 Jan. 3, 2008

(51) Int. Cl.
*H04W 36/00* (2009.01)

(52) U.S. Cl.
USPC .......................... 455/436; 370/331; 370/350

(58) Field of Classification Search
USPC .................. 455/127.1, 436; 370/508; 710/72; 342/357.02
See application file for complete search history.

(56) References Cited

U.S. PATENT DOCUMENTS

| 5,870,675 | A * | 2/1999 | Tuutijarvi et al. | ............ | 455/436 |
| 6,434,645 | B1 * | 8/2002 | Parvin et al. | ..................... | 710/72 |
| 6,711,537 | B1 * | 3/2004 | Beaucoup | ..................... | 704/220 |
| 6,782,244 | B2 * | 8/2004 | Steel et al. | .................. | 455/127.1 |
| 7,375,681 | B1 * | 5/2008 | Woo | .......................... | 342/357.02 |
| 2006/0087466 | A1 * | 4/2006 | Domingo | ....................... | 341/144 |
| 2006/0229028 | A1 * | 10/2006 | Somayajula | .................... | 455/73 |
| 2006/0251130 | A1 * | 11/2006 | Greer et al. | .................... | 370/508 |

OTHER PUBLICATIONS

Atmel, ASF01 GSM Voice Codec Macrocell, Jul. 2003, Atmel Corporation, pp. 1-30.*
U.S. Appl. No. 11/153,065, filed Jun. 15, 2005, entitled "Synchronizing a Modem and Vocoder of a Mobile Station" by David O. Anderton and Jeffrey L. Yiin.
U.S. Appl. No. 11/152,136, filed Jun. 14, 2005, entitled "Performing Diagnostics in a Wireless System" by David O. Anderton.
U.S. Appl. No. 11/172,213, filed Jun. 29, 2005, entitled "Startup Apparatus and Technique for a Wireless System That Uses Time Domain Isolation" by David O. Anderton, Jeffrey Yiin; Xue-Mei Gong.
Peter Dent, "GSM Adaptive Multi-Rate Voice Coding on the TMS320C62x DSP" Feb. 2000, pp. 1-17.

* cited by examiner

*Primary Examiner* — German J Viana di Prisco
(74) *Attorney, Agent, or Firm* — Howison & Arnott, L.L.P.

(57) ABSTRACT

In one embodiment, the present invention includes a method for determining if a mobile station is to be resynchronized on a handover from a first serving cell to a second serving cell. If so, a first downlink hardware storage may be drained to a predetermined level. This level may then be maintained during the resynchronization.

18 Claims, 4 Drawing Sheets

US 8,718,645 B2

MANAGING AUDIO DURING A HANDOVER IN A WIRELESS SYSTEM

FIELD OF THE INVENTION

The present invention relates to data processing and more particularly to speech processing in a wireless device.

BACKGROUND

Wireless devices or mobile stations (MS) such as cellular handsets transmit and receive speech waveforms. Baseband signal processing internal to such a handset is generally divided into two principal components, a vocoder and a modem. The function of the vocoder is to perform source encoding and decoding on speech waveforms. Source coding removes redundancy from the waveform and reduces the bandwidth (or equivalently the bit-rate) in order to transmit the waveform in real-time. The modem typically includes a channel encoder/decoder and a channel modulator/demodulator. The function of the channel coder is to increase redundancy in the transmitted signal in a controlled fashion to enhance the robustness of the transmitted signal. The channel modulator/demodulator converts the data stream into a format suitable for transmission in a bandlimited radio frequency (RF) channel.

When a mobile station is in transit during use, reception between the mobile station and a serving cell such as a base station can degrade. For example, the RF signal may fade as the mobile station moves farther away from a serving base station. Accordingly, a handover process may occur, in which serving of a mobile station transfers from a first serving cell to a second serving cell. During the handover, various procedures are performed to transfer the mobile station between serving cells. These procedures allow the mobile station to be synchronized to the new serving cell, which may operate at a different frequency and different timing parameters, for example, different hypersequences and the like.

Handovers are among the most complex functions that a wireless network manages, and accordingly challenges exist in maintaining a high quality connection during such a handover. To effect a smooth transition, some mobile devices simply mute audio during the handover process and start up fresh on the new serving cell. However, this mute period may be sufficiently long to disturb the caller who may believe that the telephone call has been terminated. Thus other phones maintain the audio path during the handover and pad the gap between serving by the first cell and the second cell with a noise fill, e.g., a comfort noise that a user perceives as background noise from the uplink device. Accordingly, the user more readily understands that the telephone call is continuing. However, this maintenance of the audio path greatly complicates synchronization between the new serving cell and components of the mobile station.

Further complicating the issue in some phones is a so-called time domain isolation (TDI). Such TDI provides for periods of gating off of noisy digital circuitry of a phone when a radio portion is operating, leading to challenges in managing a codec interface. Because of TDI, relatively large buffers for audio data exist in hardware of the mobile station. Specifically, both uplink and downlink audio paths incorporate large buffers that can hold significant amounts of data, e.g., at least 10-15 milliseconds (ms) of audio data. These buffers further complicate handovers.

A need thus exists to improve handing over of a mobile station from one serving cell to another.

SUMMARY OF THE INVENTION

In one aspect, the present invention includes a method for determining if a mobile station is to be resynchronized on a handover from a first serving cell to a second serving cell, draining a first downlink storage to a predetermined level if the mobile station is to be resynchronized, and maintaining the first downlink storage at the predetermined level during the resynchronization. Comfort noise data may be loaded into the first downlink storage to maintain the predetermined level, in certain situations. During the resynchronization, an audio path may be maintained, even in the presence of a time domain isolation event.

Another aspect is directed to an apparatus that includes a first buffer to store audio samples, where the first buffer is controlled to maintain a predetermined level of the audio samples during a handover from a first serving cell to a second serving cell. The apparatus may further include an interpolator to interpolate the audio samples into audio data, and a second buffer to store the audio data. A processor of the apparatus may determine initiation of the handover and cause the first buffer to be drained to the predetermined level, and a controller coupled to the processor may inform the processor of handover initiation. The processor may further calculate a pointer location for a data storage coupled to the first buffer based on cell properties of the second serving cell and a data level of the first and second buffers.

Yet another aspect of the present invention is directed to a system that includes an output device to output an audio signal obtained from audio data, a first buffer coupled to the output device to store the audio data, a digital-to-analog converter (DAC) coupled to the first buffer to convert sample data into the audio data, a second buffer coupled to the DAC to store the sample data, and a digital signal processor (DSP) coupled to the second buffer to pass the sample data to the second buffer. The DSP may maintain a preselected level of sample data in the second buffer during a handover of the system from a first base station to a second base station. In some implementations, the second buffer may be a first-in-first-out (FIFO) buffer and the preselected level is sufficient to maintain the audio signal to the output device during a time domain isolation event occurring during the handover. The DSP may further calculate a pointer location for a data storage of the DSP coupled to the second buffer. The calculation may be based on cell properties of the second base station and a data level of the first and second buffers.

In one embodiment, the system may be a wireless device such as a cellular telephone handset, personal digital assistant (PDA) or other mobile device. Such a system may include a transceiver, as well as digital circuitry. The digital circuitry may include circuitry such as an IC that includes at least some of the above-described hardware, as well as control logic to implement the above-described methods.

DETAILED DESCRIPTION

Figure 1:
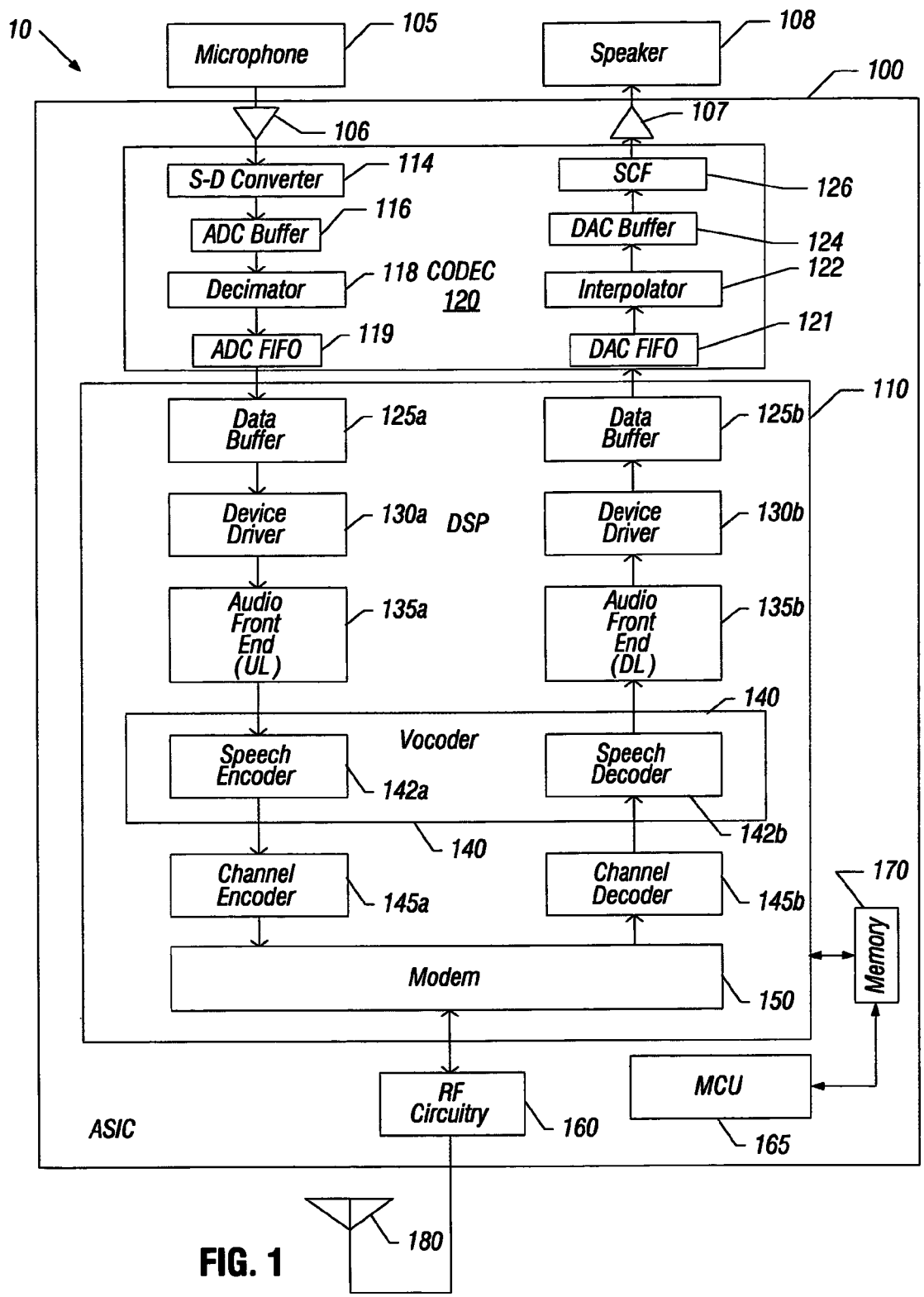
FIG. 1 is a block diagram of a signal processing transmission chain for audio data in a wireless device in accordance with an embodiment of the present invention.

Handovers are frequent events during use of mobile stations when in transit. Various activities occur in both the mobile station and the wireless network to effect a handover from a current serving cell to a new serving cell. From the perspective of the traffic channel (i.e., logical channel) bearing the audio data, the following actions occur. First, the mobile station may receive a command from the current serving cell to transfer to a new physical channel. In response, the mobile station may send an acknowledgment to the serving cell to cease transmission on the current physical channel. The mobile station then adjusts its internal timing to match parameters of the new serving cell. Finally, the mobile station is ready to begin transmission on the new physical channel. Depending on the type of assignment of connection, the mobile station may transmit control information for a protracted period of time to achieve a logical connection with the new serving cell. In the case of an immediate assignment, traffic transmission may resume directly. In any event, these actions take a significant amount of time (with respect to processing of speech data) and accordingly, various efforts may be made to maintain a high quality connection with the network during such a handover.

In addition to the steps described above, an acoustic subsystem of the mobile station may also perform various tasks to effect a handover. First, speech frames may be missing, as in-band signaling may rob frames for control data. Further, gaps in transmission may occur. Such gaps may be filled with appropriate noise fill (e.g., comfort noise) to give a user the sensation that the call remains intact. Depending on the type of handover and the given parameters of serving cells, the audio path may be transitioned gracefully to new encoding mechanisms such as a new vocoder type, particularly if the handover involves a change in traffic channel type.

Still further, the audio path may adjust its timing to maintain synchronization with a modem (i.e., modulator/demodulator) after the handover. Such synchronization (i.e., resynchronization) typically involves enforcing a temporal displacement in frame structure, as different serving cells are not synchronized. This temporal displacement may be a combination of raw frame timing differential between serving cells and a differential in the hyperframe sequence between the cells. Note that different types of handovers are possible. Some handovers may be intra-cellular handovers. That is, a handover may occur between different cellular regions of a single base station, e.g., based on different antenna locations of the base station. In such handovers, fewer changes may be performed to resynchronize. However, other handovers are inter-cellular handovers in which a mobile station is handed off from a first serving cell to a second serving cell. In these instances, there is no guarantee of synchronization of any parameters such as frequency, timing, hyperframe sequence and so forth. That is, in a GSM system, different base stations are unsynchronized and accordingly a temporal displacement in frame structure can occur on a handover. The temporal displacement may be a combination of the raw frame timing differential between two serving cells, and the differential in the hyperframe sequence.

Because typical mobile stations operate on a stream of speech blocks of a predetermined amount, e.g., 20 ms, resynchronization causes a shift in timing that effectively causes the occurrence of a random speech block having a duration between 0 and 40 ms. In various embodiments, resynchronizations may be performed while maintaining an audio path active during the resynchronization operations. In this way, audio drop-outs can be avoided, leading to a better user experience during handovers. To maintain an audio path active during a handover, various activities may be performed to control different components of the audio transmission path during the handover. While further details are described below, at a high level embodiments may be used to control various storage mechanisms that buffer relatively large amounts of audio data, both in uplink and downlink directions. Specifically, in a downlink direction certain buffers may be controlled to maintain at least a predetermined level of data in the buffers. In this way, valid audio data, which may be voice data or more likely so-called comfort noise, is available for playing out of a mobile station during the handover process, even in the presence of gated operation of the digital circuitry for time domain isolation (TDI). Accordingly, by maintaining one or more such buffers at a predetermined level, the risk of running out of data in the buffer(s) is minimized. Furthermore, by maintaining a relatively low level of data in the buffer(s), on initiation of voice processing on the new serving cell, synchronization is more easily performed. Note that if the buffer(s) empty, undesired sounds may emanate from the mobile station.

Referring now to FIG. 1, shown is a block diagram of a transmission chain used for signal processing of audio data in a wireless device in accordance with an embodiment of the present invention. The transmission chain may take the form of multiple components within a cellular handset or other mobile station, for example. As shown in FIG. 1, a wireless device 10 has an application specific integrated circuit (ASIC) 100 that may include both baseband and radio frequency (RF) circuitry. The baseband circuitry may include a digital signal processor (DSP) 110. DSP 110 may process incoming and outgoing audio samples in accordance with various algorithms for filtering, coding, and the like. As shown in FIG. 1, RF circuitry 160 is coupled to DSP 110 to handle processing at RF frequencies.

Because RF circuitry 160 processes relatively low magnitude signals, its operation may be affected by ground noise, inductive coupling, capacitive coupling, and so forth, which are generated by certain "noisy" digital components, e.g., DSP 110, a keyboard scanner, etc., of wireless device 10. Thus, time domain isolation may be used to silence certain "noisy" digital circuitry during operation of RF circuitry 160. Pursuant to TDI, in general, RF circuitry 160 operates when signal-processing circuitry of wireless device 10 is inactive, and vice versa. As a consequence, operation of the "noisy" digital components does not interfere with the performance of RF circuitry 160, and vice versa. RF circuitry 160 is generally turned on during RF time slots and turned off during signal-processing time slots. Likewise, the "noisy" digital components are turned on during the signal processing time slots and are turned off during the RF time slots.

As described above, DSP 110 is a "noisy" digital component of wireless device 10, which is shut down during the RF time slots. One challenge that is associated with turning off DSP 110 during the RF time slots is maintaining continuity in the functions that are performed by DSP 110. For instance, a voiceband audio stream processes one data sample every 125 microseconds (μs). In one embodiment, the duration of an RF time slot may exceed five milliseconds (ms), or the equivalent of forty audio data samples. Since DSP 110 is inactive during this interval, circuitry may be provided to buffer the acoustic data in both uplink and downlink directions.

While shown as including a number of particular components in the embodiment of FIG. 1, it is to be understood that DSP 110 may include additional components and similarly, some portions of DSP 110 shown in FIG. 1 may instead be accommodated outside of DSP 110. It is also to be understood that DSP 110 may be implemented as one or more processing units to perform the various functions shown in FIG. 1 under software control. That is, the functionality of the different components shown within DSP 110 may be performed by common hardware of the DSP according to one or more software routines. As further shown in FIG. 1, ASIC 100 may include a microcontroller unit (MCU) 165. MCU 165 may be adapted to execute control applications and handle other functions of ASIC 100. In some embodiments, MCU 165 may communicate with DSP 110 via a memory 170, e.g., a shared memory coupled to both components. In this way, status and control registers may be written by one or the other of MCU 165 and DSP 110 for reading by the other.

DSP 110 may be adapted to perform various signal processing functions on audio data. In an uplink direction, DSP 110 may receive incoming voice information, for example, from a microphone 105 of the handset and process the voice information for an uplink transmission from the handset. This incoming audio data may be amplified in an amplifier 106. The resulting signal is then converted into a digital format using a codec 120 generally formed of an analog-to-digital converter (ADC) and a digital-to-analog converter (DAC). In some embodiments, the analog voice information may be sampled at 8,000 samples per second (kS/s).

A converter such as a sigma-delta converter (SDC) 114 may be coupled to receive analog audio data and sample it into digital form. Next, a hardware storage, such as a buffer, namely ADC buffer 116, may be coupled to SDC 114 to receive the incoming sampled data and buffer it. The digitized sampled data may then be decimated in a decimator 118, effectively modifying the sampling rate of the data, which then may be stored in another hardware storage associated with codec 120, specifically a first-in-first-out (FIFO) buffer 119 (ADC FIFO). While shown as being part of codec 120, it is to be understood that in various embodiments, ADC buffer 116 and ADC FIFO 119 may be located elsewhere. As will be described further below, these hardware storages enable bridging of TDI periods.

ADC FIFO 119 is in turn coupled to a temporary storage medium, such as a buffer 125a. In some embodiments, one or more such buffers may be present in each of an uplink and downlink direction. While shown in FIG. 1 as being part of DSP 110, it is to be understood that the buffers may be located within another portion of ASIC 100 or even external to the chip, so long as they are accessible by DSP 110. While the type of storage may vary in different embodiments, buffer 125a may be a FIFO buffer or a circular buffer. In addition to storage, buffer 125a may include various control registers, including one or more pointers to indicate the current storage location to be next accessed. For example, each buffer may include a write pointer to point to the next storage location to be written to and a read pointer to point to the next storage location to be read from.

The sampled data may be collected and stored in buffer 125a until a complete data frame is stored. While the size of such a data frame may vary, in embodiments used in a time division multiple access (TDMA) system, a data frame (also referred to as a "speech frame") may correspond to 20 ms of real-time speech (e.g., corresponding to 160 speech samples). In various embodiments, input buffer 125a may hold 20 ms or more of audio data from the ADC. As will be described further below, an output buffer 125b may hold 20 ms or more of audio data to be conveyed to DAC 122, and in a particular embodiment a buffer to store at least 30 ms may be used.

The buffered data samples may be provided to a device driver 130a for processing. In some embodiments, the storage buffers may be located within the device driver. From device driver 130a, the data is provided to a front-end processor 135a for further processing, such as equalization, volume control, fading, echo suppression, echo cancellation, noise suppression, automatic gain control (AGC), and the like. From front-end processor 135a data is provided to a vocoder 140 for encoding and compression. As shown in FIG. 1, vocoder 140 may include a speech encoder 142a in the uplink direction and a speech decoder 142b in a downlink direction. Vocoder 140 then passes the data via a channel encoder 145a to a modem 150 for modulation. The modulated data is then provided to RF circuitry 160, which may be a transceiver including both receive and transmit functions to take the modulated baseband signals from modem 150 and convert them to a desired RF frequency (and vice versa). From there, the RF signals including the modulated data are transmitted from the handset via an antenna 180.

In a downlink direction, incoming RF signals may be received by antenna 180 and provided to RF circuitry 160 for conversion to baseband signals. The transmission chain then occurs in reverse such that the modulated baseband signals are coupled through modem 150, a channel decoder 145b, vocoder 140, front-end processor 135b, device driver 130b, buffer 125b, and codec 120 to obtain analog audio data that is coupled to, for example, a speaker 108 of the handset.

As shown in FIG. 1, codec 120 may include or be coupled to various hardware storages, including a DAC FIFO 121 on an input side and a DAC buffer 124 on an output side. DAC FIFO 121 may receive digitized audio data from DSP 110. DAC FIFO 121 may provide additional buffering, e.g., 8 ms. In one embodiment DAC FIFO 121 may be implemented in circuitry that is shut down during the RF time slots. In general, if DAC FIFO 121 runs out of speech data, DSP 110 can be interrupted at a certain rate (a rate of 8 kilohertz (kHz), for example) to take corrective action (writing comfort noise data, for example, if no speech data is currently available) to the downlink path to keep it primed with data.

In some implementations, codec 120 may include an interpolator 122 to receive data from DAC FIFO 121. The interpolator may include a delta sigma modulator. The modulator may modulate a multi-bit oversampled input signal to provide a one bit oversampled digital output signal, in accordance with some embodiments of the invention. For example, interpolator 122 may sample a 13-bit data input stream from DAC FIFO 121 to produce a corresponding oversampled one bit sign of change signal at its output. In one embodiment, DAC buffer 124 may have a sufficient capacity to store at least 5.8 ms of audio data. DAC buffer 124 may not be turned off during the RF time slots and instead continues to operate whenever the audio path is active. When data is available in DAC buffer 124, e.g., a switched capacitor filter (SCF) 126 coupled to an output of DAC buffer 124 provides a corresponding analog signal to an amplifier 107 to drive speaker 108.

For purposes of discussion, a GSM system implementing a TDMA scheme will be used. However, it is to be understood that any other wireless communication standard that performs handovers may implement the methods and apparatus disclosed herein. The fundamental repeatable unit in a GSM traffic channel is a sequence of 26 TMDA frames. This frame structure is replicated over and over again for the duration of a phone call. Each TDMA frame is 4.615 ms in duration, and thus a frame sequence of 26 TDMA frames consumes 120 ms of real-time. In various embodiments, this frame sequence may be processed in multiple blocks. For example, speech blocks or frames of 20 ms each may be processed. Thus a frame sequence may represent the transmission and reception of six distinct speech frames (each 20 ms in duration). Specifying when any one of these speech frames or blocks fills with respect to the full-frame structure may define modem-vocoder timing in the uplink direction. Similarly, specifying when any one of these speech frames empties on the downlink side is sufficient to specify modem-vocoder timing in the downlink direction. Note that different cells may operate at different timing with respect to such speech frames.

Figure 2:
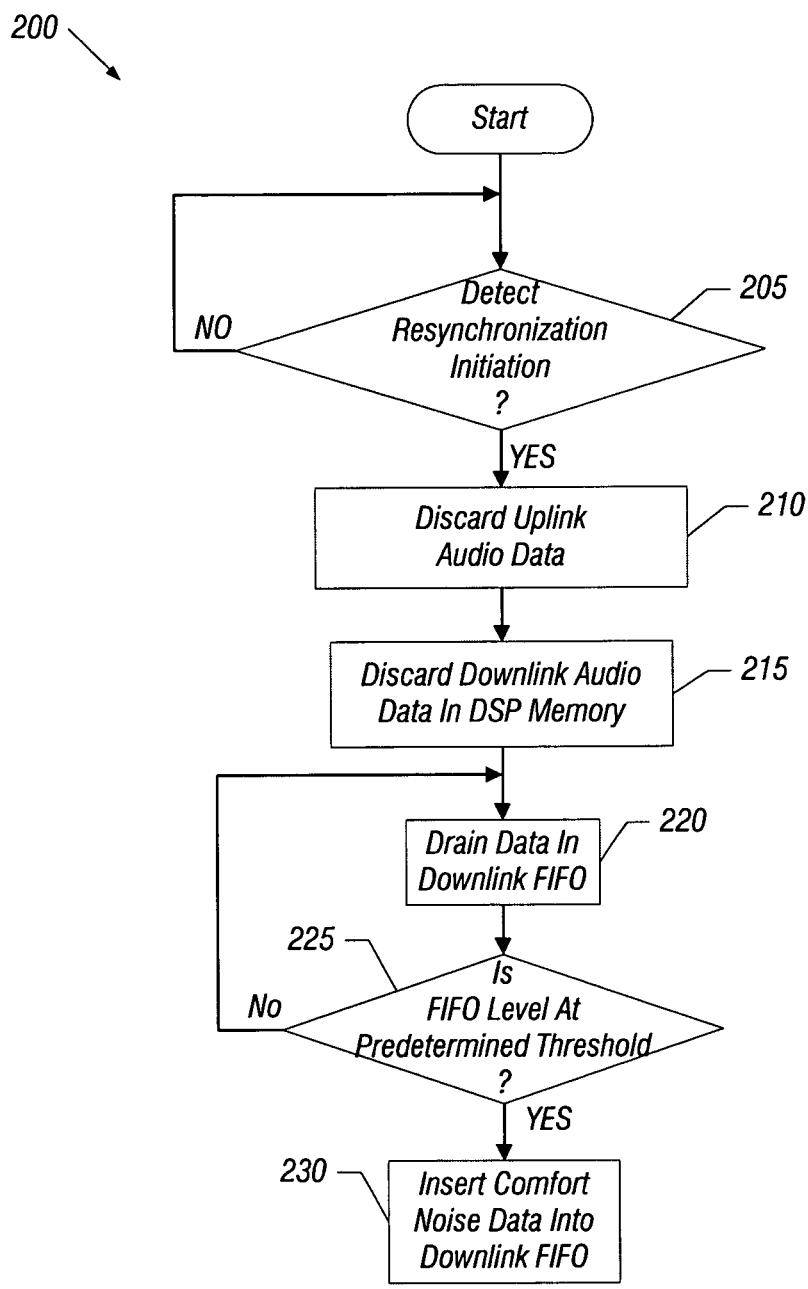
FIG. 2 is a flow diagram of a method for initiating a resynchronization operation in accordance with one embodiment of the present invention.

Referring now to FIG. 2, shown is a flow diagram of a method for initiating a resynchronization operation in accordance with one embodiment of the present invention. Specifically, method 200 may be used to perform activities in a mobile station during a handover process from a first serving cell to a second serving cell. In various implementations, method 200 may be performed in a controller such as a DSP or other configurable logic. In one embodiment, method 200 may be implemented in driver code, such as code executing on the DSP to control various resources, including resources of the DSP and hardware resources such as a codec.

As shown in FIG. 2, method 200 may begin by determining if a resynchronization initiation has been detected (diamond 205). In some embodiments, a MCU may set an indicator such as a flag in a shared memory location to indicate initiation of a resynchronization operation when a cell handover occurs. If no initiation is detected, diamond 205 may loop back on itself. If the resynchronization is initiated, control passes to block 210. There, uplink audio data may be discarded (block 210). That is, during a resynchronization process, uplink audio data is not transmitted. Instead, uplink hardware buffers (e.g., an ADC buffer and an ADC FIFO) may be kept empty. That is, although incoming speech data, if present is passed through the buffers, outgoing speech data from the ADC FIFO may not pass into the associated DSP for processing.

Control passes from block 210 to block 215. There, downlink audio data in a DSP memory may be discarded (block 215). That is, any downlink data remaining in an internal (e.g., software) buffer may be discarded. Thus scheduling of all audio tasks may be inhibited to avoid generation or consumption of audio data in the DSP. Note however that the audio driver may continue to run. Next, control passes to block 220. There, data in a downlink FIFO (i.e., a DAC FIFO) may be drained (block 220). More specifically, the data may be allowed to drain until the data level of the FIFO reaches a given threshold. Thus control passes from block 220 to diamond 225, where it may be determined whether the FIFO level is at the predetermined threshold (diamond 225). While the scope of the present invention is not limited in this regard, in various implementations the predetermined threshold may correspond to a given time or number of data samples. For example, in one embodiment the predetermined threshold may correspond to 8 data samples or 1 ms. In other embodiments, the threshold may correspond to a half full level of the FIFO. If the downlink FIFO has not drained to the appropriate level, control passes back to block 220. Otherwise, when the predetermined threshold level is met control passes to block 230.

Still referring to FIG. 2, comfort noise data may be inserted into the downlink FIFO (block 230). As an example, a driver may generate comfort noise and provide this data to the downlink FIFO to maintain the FIFO level at the predetermined threshold. By providing comfort noise data on this basis, a level of the buffer may be maintained to avoid buffer underflow (even during TDI intervals). However, the level of the buffer may be limited to prevent it from accumulating an amount of data that could complicate resynchronization on a new serving cell.

Such insertion of comfort noise data may continue for the remainder of a resynchronization. While described with this particular implementation in the embodiment FIG. 2, it is to be understood that the scope of the present invention is not limited in this regard. For example, other embodiments may perform different mechanisms to enable control of, at least, the downlink FIFO at a given level so that sufficient audio data is present in order to avoid draining of the corresponding downlink buffer, e.g., due to a TDI event or other reasons.

Figure 3:
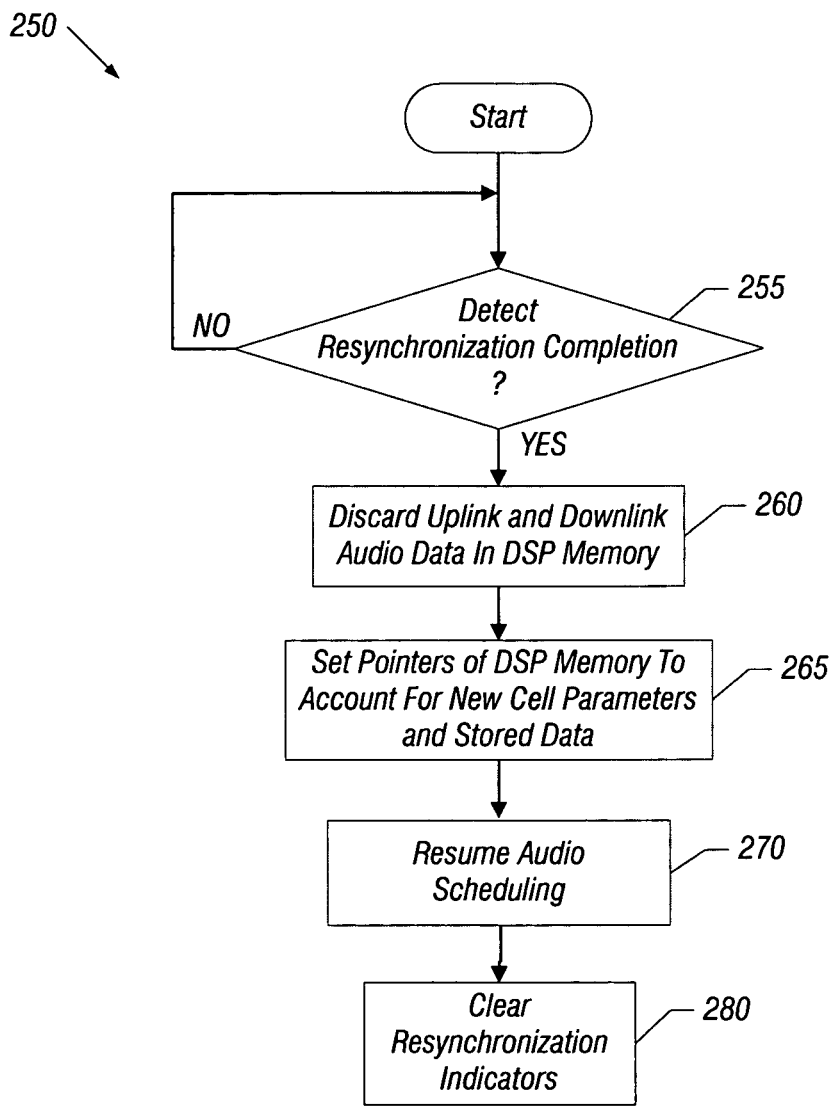
FIG. 3 is a flow diagram of a method for completing a resynchronization operation in accordance with an embodiment of the present invention.

Referring now to FIG. 3, shown is a flow diagram of a method for completing a resynchronization operation in accordance with an embodiment of the present invention. As shown in FIG. 3, method 250 may begin by determining whether a resynchronization has been completed (diamond 255). For example, in one embodiment a DSP may check a status indicator, e.g., in a shared memory that is set by an MCU upon completion of resynchronization. In various embodiments, the MCU may set a resynchronization completion indicator after the MCU has performed its activities with respect to resynchronization, such as adjustment of TDMA frame timing, updating of the frame number to synchronize with the hyperframe on the new serving cell, among other such tasks.

Next, control passes to block 260. There, both uplink and downlink audio data in DSP memory may be discarded (block 260). That is, on detection of completion of resynchronization, data buffers in DSP memory may be flushed. This flushing may occur as any data in the buffers is not to be processed after the resynchronization. From block 260 control passes to block 265. At block 265, pointers of the DSP memory may be set to account for new serving cell parameters and stored data. That is, read and write pointers for a software buffer in the DSP may be positioned to enable proper handling of audio data in both uplink and downlink directions. Note that in addition to read and write pointers, values of other pointers, such as various sidetone pointers may also be calculated and set to their appropriate level. These values may be calculated based on timing data associated with the new cell parameters, which may include the delay budget and new frame timing.

With respect to the uplink direction, the pointers may be set according to this calculation of delay budget and new frame timing. However, in the downlink direction a determination of pointer location also takes into account the pending levels of the downlink hardware buffers. That is, the levels of a DAC buffer and a DAC FIFO may be considered in determining the appropriate positioning of pointers for a downlink software buffer. This is so, as due to the steps taken during resynchronization, these hardware buffers are not empty. Instead, it may be assumed that the DAC buffer is at least substantially full and at least a small amount of data, e.g., the predetermined threshold exists in the DAC FIFO. In some embodiments, the level of the FIFO may be determined by directly checking its level. However, in some implementations there may be no manner of determining the level of the DAC buffer. Accordingly, in such embodiments a selected level of the buffer, which may correspond to a half-full or substantially full level, for example, may be used; however, the scope of the present invention is not limited in this regard.

Still referring to FIG. 3, control passes from block 265 to block 270, where audio scheduling may be resumed. That is, normal signal processing operations in both uplink and downlink directions may be resumed in the DSP. Furthermore, various indicators, e.g., in a shared memory accessible to both DSP and MCU may be cleared or reset to indicate that resynchronization operations have been completed (block 280). While described with this particular implementation in the embodiment of FIG. 3, other variations are possible. For example, additional operations may be performed in the DSP during resynchronization. For instance, if a vocoder type has changed pursuant to the handover, speech encoders and decoders (i.e., of the vocoder) may be reset to the appropriate vocoder type. In some implementations, even if a vocoder change does not occur, the speech encoders or decoders may be reset. To announce completion of resynchronization operations, in some implementations a speech encoder may emit a homing pattern to effect a reset of a decoder in a base station (i.e., a new serving cell) with which the mobile station is communicating.

The methods described herein may be implemented in software, firmware, and/or hardware. A software implementation may include an article in the form of a machine-readable storage medium onto which there are stored instructions and data that form a software program to perform such methods. As an example, the DSP may include instructions or may be programmed with instructions stored in a storage medium to perform audio management during handovers in accordance with an embodiment of the present invention.

Figure 4:
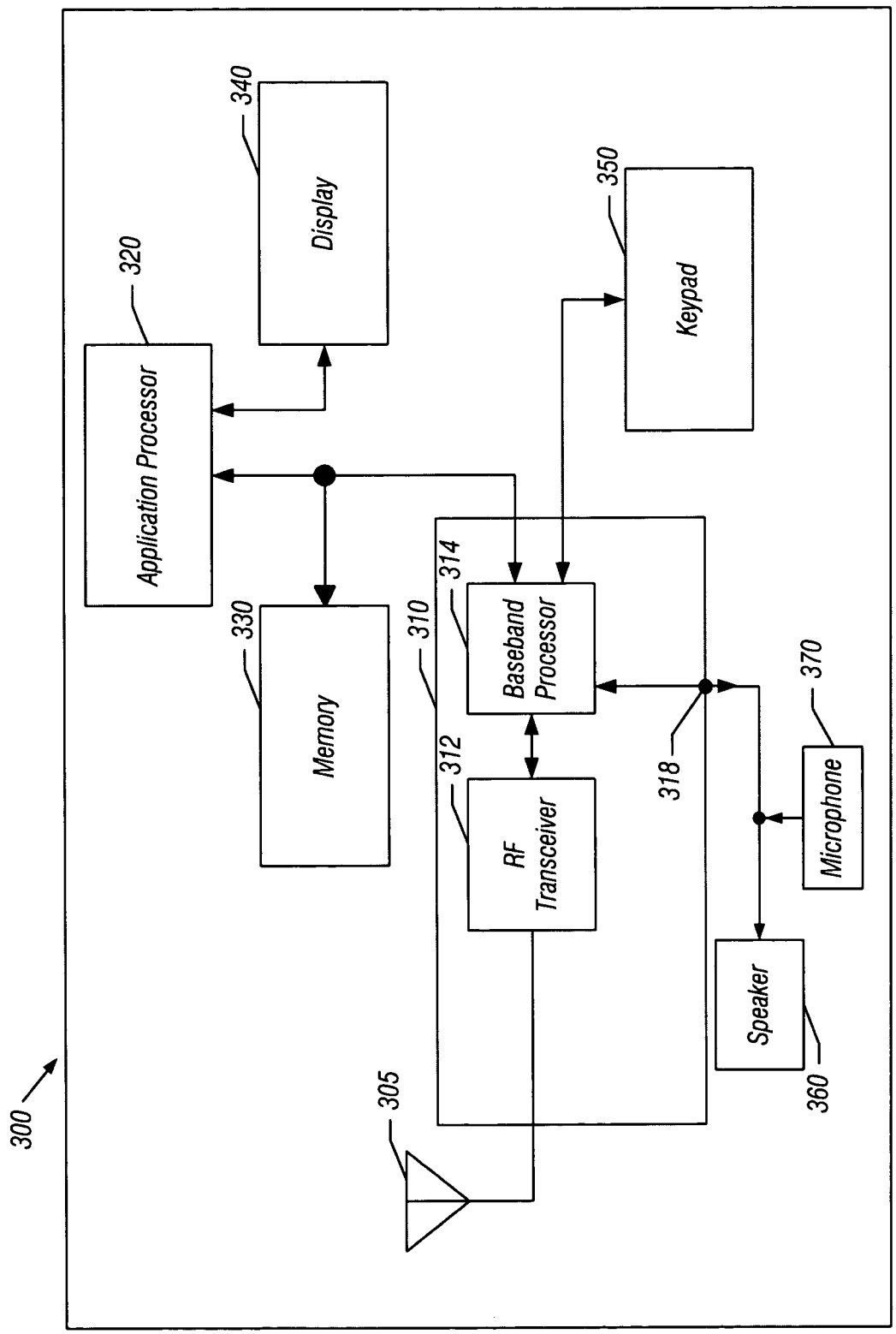
FIG. 4 is a block diagram of a system in accordance with one embodiment of the present invention.

Referring now to FIG. 4, shown is a block diagram of a system in accordance with one embodiment of the present invention. As shown in FIG. 4, system 300 may be a wireless device, such as a cellular telephone, PDA, portable computer or the like. An antenna 305 is present to receive and transmit RF signals. Antenna 305 may receive different bands of incoming RF signals using an antenna switch. For example, a quad-band receiver may be adapted to receive GSM communications, enhanced GSM (EGSM), digital cellular system (DCS) and personal communication system (PCS) signals, although the scope of the present invention is not so limited. In other embodiments, antenna 305 may be adapted for use in a general packet radio service (GPRS) device, a satellite tuner, or a wireless local area network (WLAN) device, for example.

Incoming RF signals are provided to a transceiver 310 which may be a single chip transceiver including both RF components and baseband components. Transceiver 310 may be formed using a complementary metal-oxide-semiconductor (CMOS) process, in some embodiments. As shown in FIG. 4, transceiver 310 includes an RF transceiver 312 and a baseband processor 314. RF transceiver 312 may include receive and transmit portions and may be adapted to provide frequency conversion between the RF spectrum and a baseband. Baseband signals are then provided to a baseband processor 314 for further processing.

In some embodiments, transceiver 310 may correspond to ASIC 100 of FIG. 1. Baseband processor 314, which may correspond to DSP 110 of FIG. 1, may be coupled through a port 318, which in turn may be coupled to an internal speaker 360 to provide voice data to an end user. Port 318 also may be coupled to an internal microphone 370 to receive voice data from the end user.

After processing signals received from RF transceiver 312, baseband processor 314 may provide such signals to various locations within system 300 including, for example, an application processor 320 and a memory 330. Application processor 320 may be a microprocessor, such as a central processing unit (CPU) to control operation of system 300 and further handle processing of application programs, such as personal information management (PIM) programs, email programs, downloaded games, and the like. Memory 330 may include different memory components, such as a flash memory and a read only memory (ROM), although the scope of the present invention is not so limited. Additionally, a display 340 is shown coupled to application processor 320 to provide display of information associated with telephone calls and application programs, for example. Furthermore, a keypad 350 may be present in system 300 to receive user input.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first downlink buffer to store audio samples, wherein the first downlink buffer is controlled to drain data in the first downlink buffer to maintain a predetermined non-empty level threshold of the audio samples or insert comfort noise when audio samples are depleted below the predetermined non-empty level threshold during a handover of the apparatus from a first serving cell to a second serving cell;
   an interpolator coupled to the first downlink buffer to interpolate the audio samples into audio data; and
   a second downlink buffer coupled to the interpolator to store the audio data.

2. The apparatus of claim 1, further comprising an output device coupled to the second downlink buffer to generate an audio output from the audio data.

3. The apparatus of claim 2, wherein the audio output comprises comfort noise during the handover.

4. The apparatus of claim 2, wherein the predetermined level enables the audio output during a time domain isolation event.

5. The apparatus of claim 1, further comprising a processor to determine initiation of the handover and to drain the data in the first downlink buffer to be drained to the predetermined non-empty level.

6. The apparatus of claim 5, further comprising a controller coupled to the processor to inform the processor of the initiation of the handover.

7. The apparatus of claim 5, wherein the processor is to provide comfort noise samples to the first downlink buffer after the first downlink buffer is drained to the predetermined non-empty level.

8. The apparatus of claim 5, wherein the processor is to calculate a pointer location for a data storage of the processor coupled to the first downlink buffer based on cell properties of the second serving cell and a data level of the first downlink buffer and the second downlink buffer.

9. The apparatus of claim 1, further comprising a storage including the first downlink buffer and the second downlink buffer.

10. A mobile station comprising:
    an output device to output an audio signal obtained from audio data;
    a first buffer coupled to the output device to store the audio data;
    a digital-to-analog converter (DAC) coupled to the first buffer to convert sample data into the audio data;
    an interpolator coupled to the first buffer;
    a second buffer coupled to the DAC to store the sample data;
    a digital signal processor (DSP) coupled to the second buffer to pass the sample data to the second buffer, wherein the DSP is configured to drain the second buffer to maintain a preselected non-zero level of the sample data or insert comfort noise when audio samples are depleted in the second buffer below the predetermined non-zero level threshold during a handover of the mobile station from a first base station to a second base station;
radio frequency (RF) circuitry coupled to the DSP; and
an antenna coupled to the RF circuitry.

11. The mobile station of claim 10, wherein the second buffer comprises a first-in-first-out (FIFO) buffer and the preselected non-zero level is sufficient to provide the audio signal to the output device during a time domain isolation event occurring during the handover.

12. The mobile station of claim 10, wherein the DSP and the RF circuitry are at least in part integrated within the same integrated circuit.

13. The mobile station of claim 10, wherein the audio data comprises comfort noise during the handover.

14. The mobile station of claim 10, wherein the DSP is to calculate a pointer location for a data storage of the DSP coupled to the second buffer based on cell properties of the second base station and a data level of the first buffer and the second buffer.

15. An apparatus comprising:
a first downlink buffer to store audio samples, wherein the first downlink buffer is controlled to maintain a predetermined non-empty level of the audio samples or insert comfort noise when audio samples are depleted below the predetermined non-empty level threshold during a handover of the apparatus from a first serving cell to a second serving cell;
an interpolator coupled to the first downlink buffer to interpolate the audio samples into audio data;
a second downlink buffer coupled to the interpolator to store the audio data; and
a processor to provide comfort noise samples to the first downlink buffer after the first downlink buffer is at the predetermined non-empty level.

16. The apparatus of claim 15, further comprising an output device coupled to the second downlink buffer to generate an audio output from the audio data.

17. The apparatus of claim 15, wherein the processor is to calculate a pointer location for a data storage of the processor coupled to the first downlink buffer based on cell properties of the second serving cell and a data level of the first downlink buffer and the second downlink buffer.

18. The apparatus of claim 15, further comprising a storage including the first downlink buffer and the second downlink buffer.

* * * * *